United States Patent [19]
du Bois

[11] 3,719,384
[45] March 6, 1973

[54] CAMPER BASE AND TRAILER
[76] Inventor: Thomas C. du Bois, 119 Colonial Avenue, Pitman, N.J. 08071
[22] Filed: Oct. 30, 1970
[21] Appl. No.: 85,551

[52] U.S. Cl.............................296/23 ML, 214/512
[51] Int. Cl. ...............................................B60p 3/32
[58] Field of Search..246/23, 23 MC, 35 A; 214/512, 214/515

[56] References Cited
UNITED STATES PATENTS 3,414,916   12/1968   Martin............................296/23 MC
3,486,785   12/1969   Corson...........................296/23 MC Primary Examiner—Philip Goodman
Attorney—John B. Dickman, III

[57] ABSTRACT

An assembly used with a camper to form a pickup trailer therefor, a drive-in base and a roof assembly for the trailer to provide an enclosed space when the trailer is not being used to support or convey a camper. The trailer is a wheeled unit adapted to square up the T-shaped camper and the base engages the wheeled trailer to form a rectangular shape for the assembly.

5 Claims, 9 Drawing Figures

PATENTED MAR 6 1973

INVENTOR.
THOMAS C. DUBOIS
BY
John B. Dickman III
AGENT.

INVENTOR.
THOMAS C. DuBOIS
BY
John B. Dickman III
AGENT.

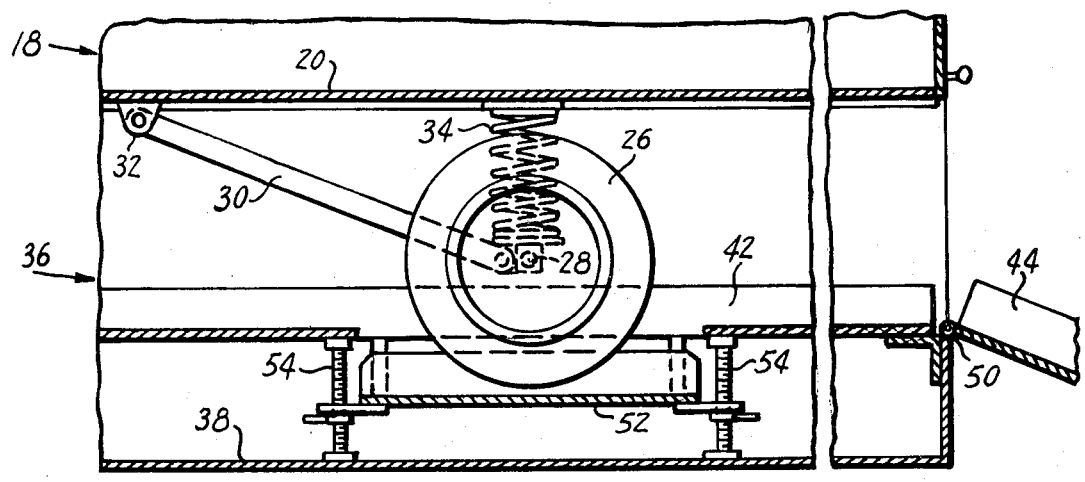
FIG.7
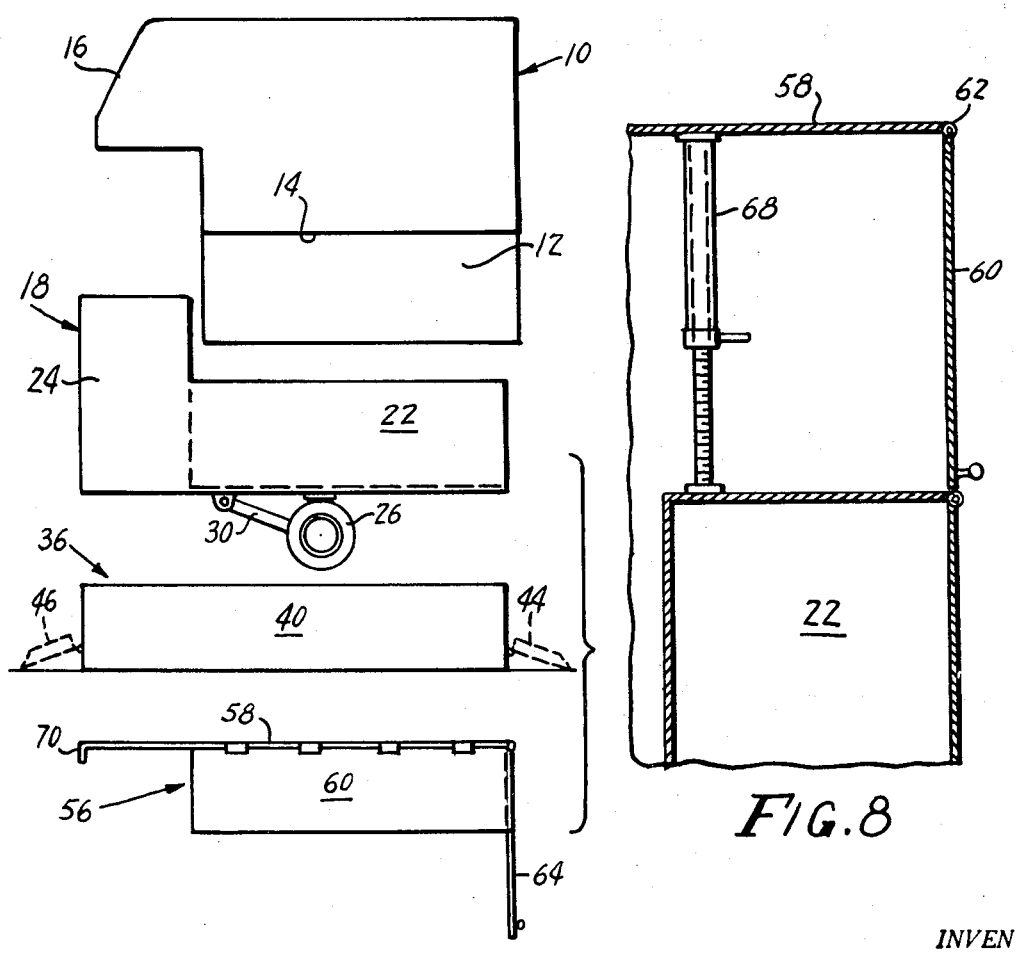
FIG.8
FIG.9
INVENTOR.
THOMAS C. DU BOIS
BY
John B. Dickman III
AGENT.

CAMPER BASE AND TRAILER

Present day campers are usually T-shaped to fit into a pickup truck body and in some instances include a forward projection which overlies the roof of the truck cab. When campers are removed from the truck, it is elevated by jacks and the truck driven from under the camper. In this condition, the camper is not stable and if lowered to the ground, damage can occur due to rain water getting under the camper. If left elevated to any degree, wind can get under it and cause it to topple or in the event of a grass fire, the fire could get under the camper and destroy it.

Accordingly, it is an object of the present invention to provide a pickup trailer for the camper which includes side storage space which fills in the recesses along each side of the camper and the recess across the front thereof thereby converting the camper to a travel trailer with the pickup trailer being separately useful as a utility trailer.

Another object of the invention is to provide a base of the same size as the pickup trailer for forming a continuation of the side walls thereof to form a skirt for the camper-pickup trailer assembly to prevent entry of fire, wind and the like under the trailer and camper.

A further object of the invention is to provide a pickup trailer for a camper which includes a removable roof for the trailer which forms a cover for the trailer when not being used to support a camper.

Still another object of this invention is to provide a pickup trailer and base having tracks therein receiving the trailer wheels with the tracks having lowerable segments for supporting the wheels to enable the pickup trailer to be lowered into supporting engagement with the base.

Yet another object of the present invention is to provide an assembly in accordance with the preceding objects which is simple in construction, easy to assemble, dependable and long lasting, effective for its purposes and relatively inexpensive to manufacture.

The following is a detailed explanation of the embodiments shown in the attached drawings illustrating the present invention, in which FIG. 1 is a side elevational view of the assembly of the present invention.

FIG. 7 is a detailed sectional view taken along section line 7—7 on FIG. 3.

FIG. 8 is a detailed sectional view of the attaching means for the components.

FIG. 9 is an exploded side elevational view of the components of the assembly.

Figure 1:
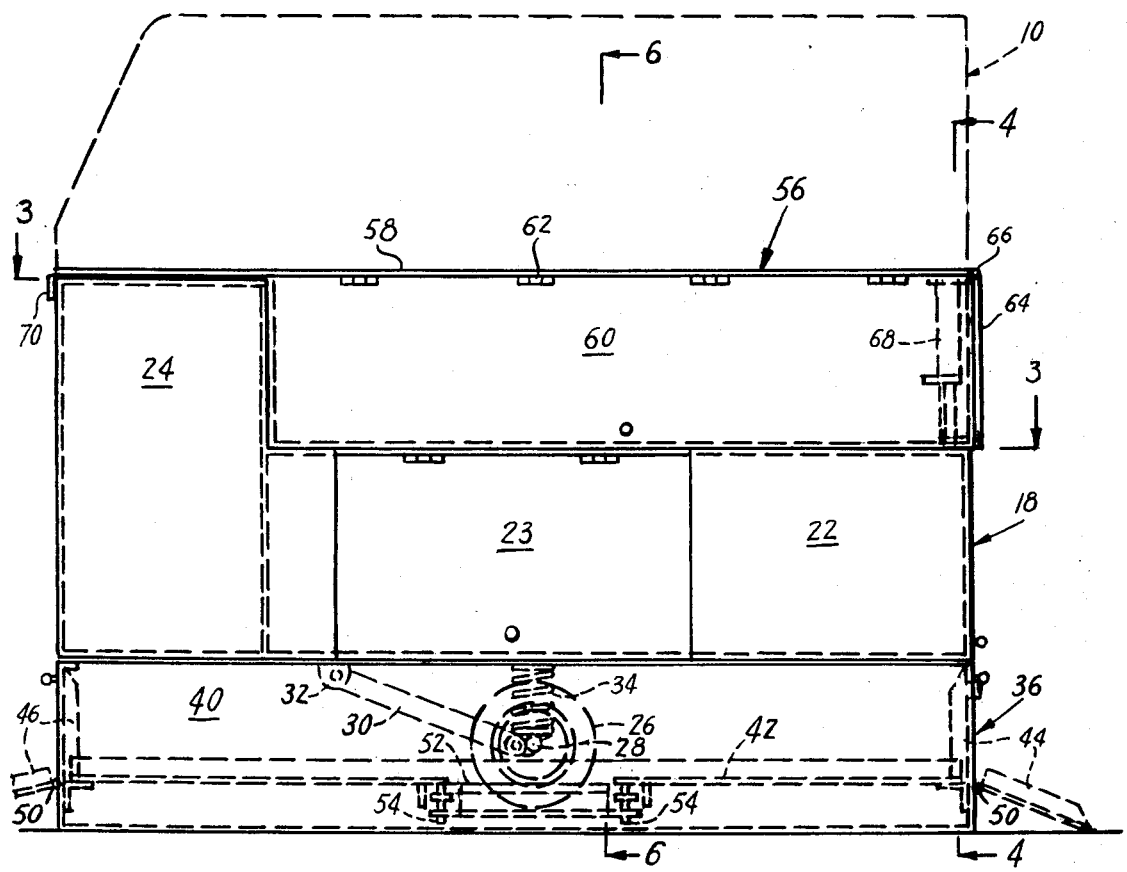
Figure 2:
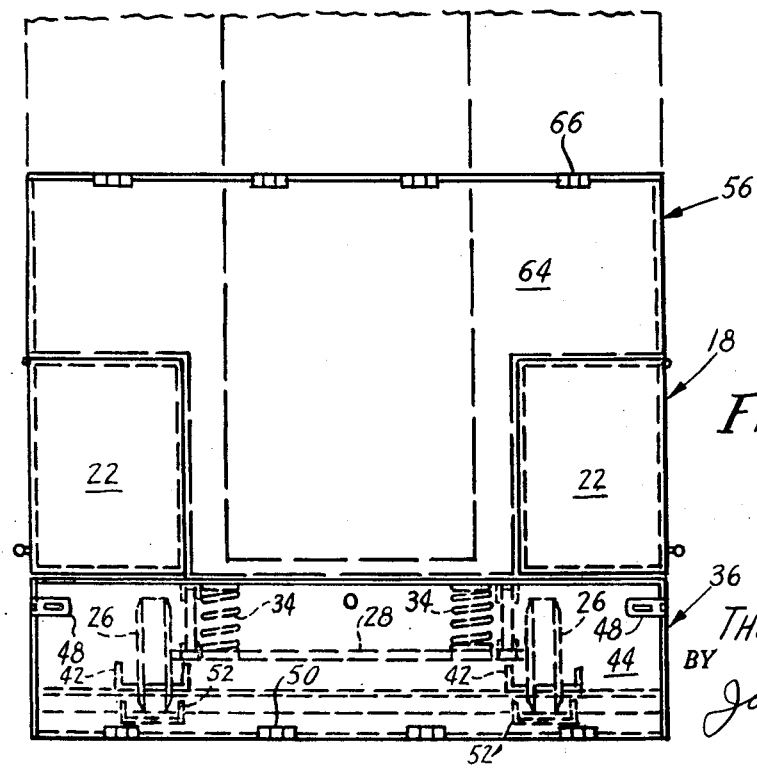
FIG. 2 is a rear elevational view thereof.
Figure 3:
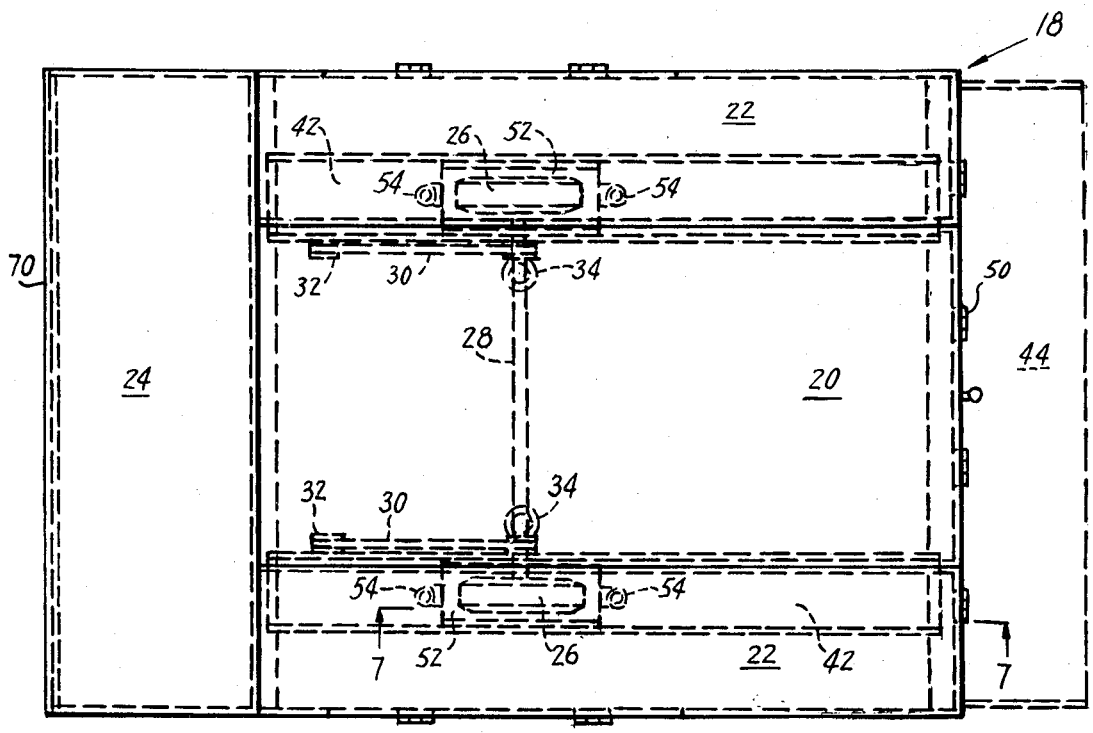
FIG. 3 is a plan sectional view along section line 3—3 on FIG. 1.
Figure 4:
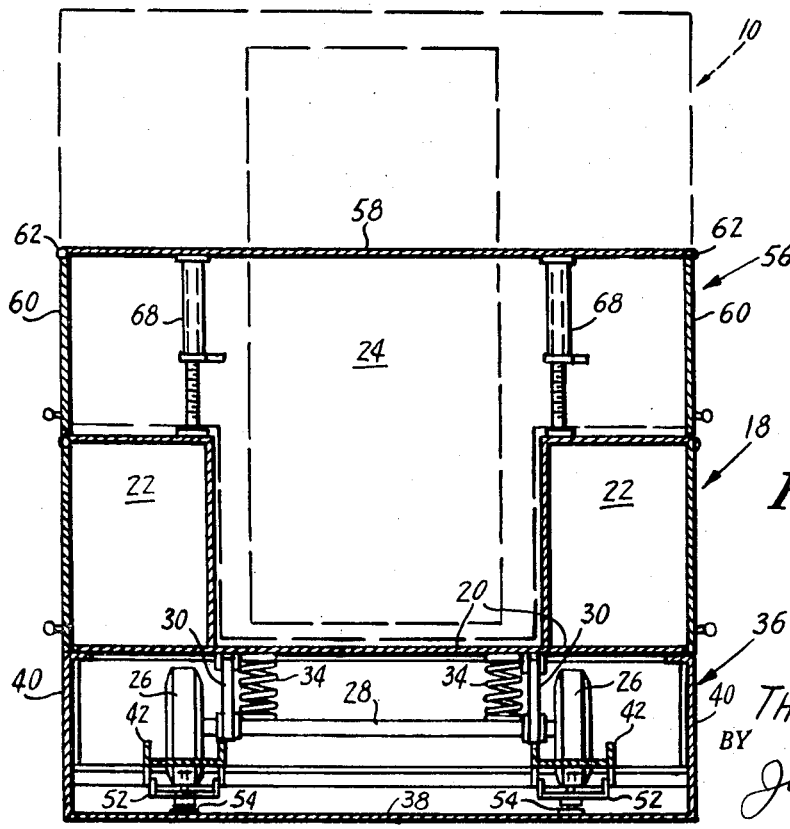
FIG. 4 is a transverse sectional view taken along section line 4—4 on FIG. 1.
Figure 6:
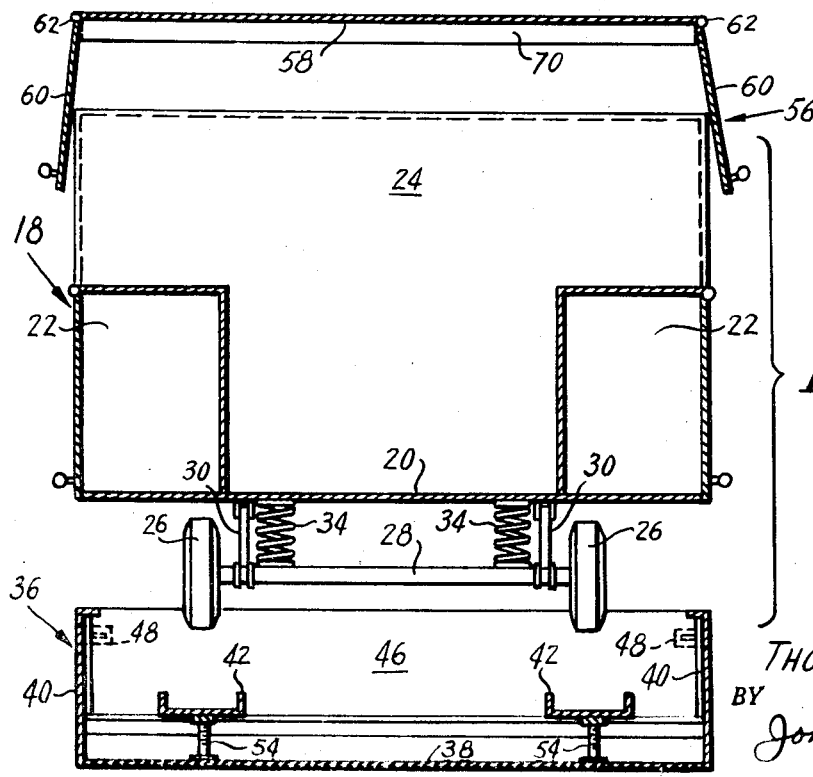
FIG. 6 is a transverse sectional view taken along section line 6—6 on FIG. 1.

Referring now specifically to the drawings, the camper is generally designated by numeral 10 and includes the usual T-shaped hollow enclosure defined by a depending narrow portion 12 formed by two side recesses 14 which receive the side walls of the pickup truck body. Also a forward projection 16 is provided which overlies the cab roof. The pickup trailer 18 supports the camper 10 and includes a bottom panel 20 provided with upwardly extending hollow side spaces 22 which fill the recesses 14 as shown in FIGS. 4 and 6. The front end of the bottom panel 20 includes an upstanding space 24 which fills in that area of the camper underlying the projection 16 thus squaring up the camper assembly.

The trailer 18 is supported by a pair of wheels 26 interconnected by an axle 28 retained movably in position by trailing arms 30 pivotally attached to brackets 32 on panel 20 and spring assemblies 34 interposed between the axle and panel 20. This structure provides a supporting running gear for the trailer and camper when supported thereon thus converting the camper into a travel trailer.

A supporting base 36 is provided for the trailer 18 and includes a bottom panel 38 and upstanding side walls 40 aligned with the outer walls of the spaces 22 in the trailer. Extending longitudinally of the base 36 is a pair of rigid channel shaped tracks 42 receiving wheels 26. The rear and forward ends of the base 36 include pivoted gates or ramps 44 and 46 which form closures for the ends of the base 36 and ramps for driving the wheels onto or off the tracks 42. Suitable latches 48 and hinges 50 are provided for the ramps 44 and 46 to enable pivotal movement thereof.

Each of the tracks 42 is provided with a movable segment 52 which supports the wheels 26. As shown in FIG. 7, each end of each segment 52 is supported by a jack 54 for raising and lowering the wheels 26 thus enabling the trailer to be driven onto the base 36 and the segments and wheels lowered so that the trailer is supported in generally sealed engagement with the top of base 36. Suitable access openings may be provided to enable access to the jacks 54 for actuation thereof for raising and lowering the trailer 18.

Figure 5:
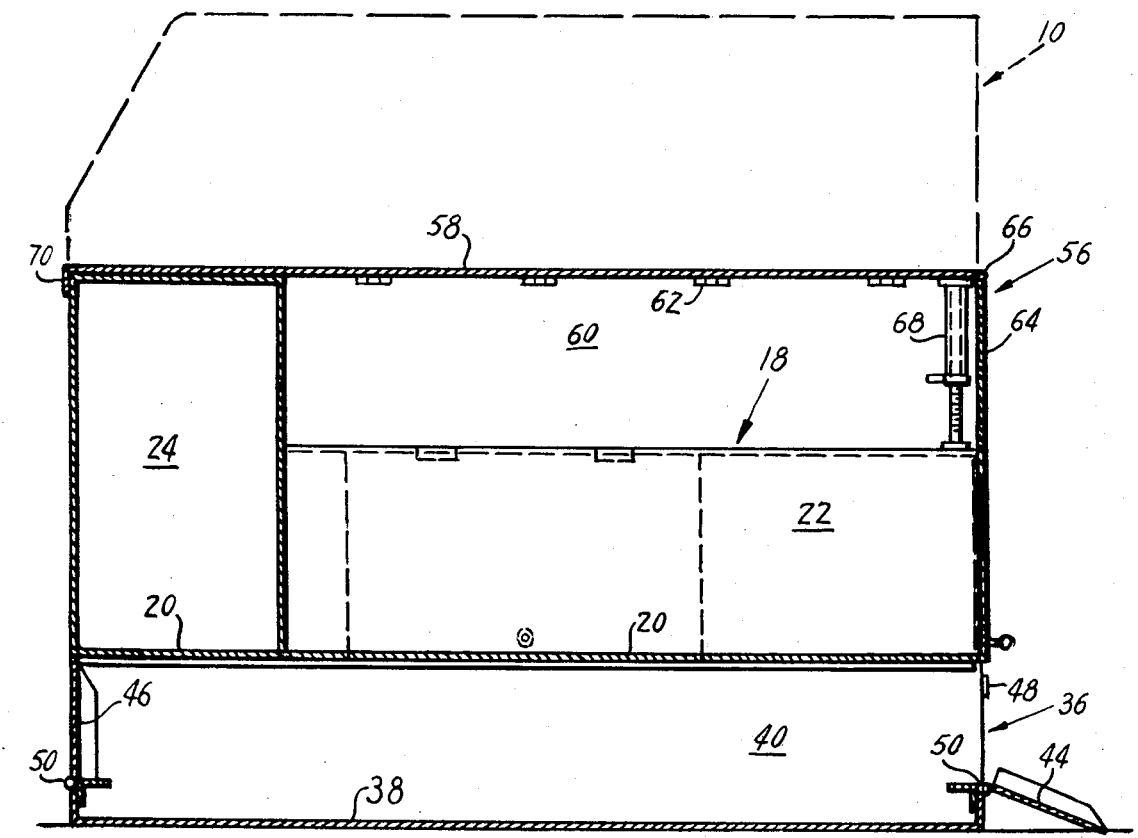
FIG. 5 is a longitudinal sectional view of the assembly.

A roof 56 is provided for the trailer 18 and includes a top panel 58, depending side walls 60 attached pivotally thereto by hinges 62 and a rear wall 64 pivotally connected thereto by hinges 66. The roof 56 is connected to the spaces 22 of the trailer 18 by screw jacks 68 which adjustably support and connect the rear portion of panel 58 to the trailer. The front edge of panel 58 is downturned at 70 and hooks over the top of the upstanding front end space 24 of the trailer 18 as shown in FIG. 5. When desired, the roof 56 may be positioned on top of the trailer 18 as illustrated in FIG. 6 and suitable access doors are provided on the various compartments.

It is apparent that, within the scope of the invention, modifications and different arrangements may be made other than as herein disclosed, and the present disclosure is illustrative merely, the invention comprehending all variations thereof.

I claim:

1. An assembly for converting a T-shaped camper into a travel trailer comprising a pickup trailer having a bottom panel, upstanding hollow side enclosures on said panel substantially filling the side portions of the T-shaped camper and supporting same, and wheel means supporting said panel to enable a camper to be supported on the trailer for mobility, said trailer including a hollow upstanding front enclosure adapted to underlie a front projection on a camper to square up the T-shaped camper, said wheel means including a pair of wheels supported by a transverse axle, spring means interposed between the axle and bottom panel, and a pair of trailing support arms mounting the axle to said bottom panel.

2. The structure as defined in claim 1 together with a supporting base for said trailer comprising a bottom member, a pair of tracks supported in spaced relation above the bottom, ramp means extending downwardly from each end of said tracks to enable the wheels of the trailer to be rolled onto and off the tracks.

3. The structure as defined in claim 2 wherein each of said tracks includes a vertically movable central section supporting said wheels, and means adjustably supporting said movable section for raising and lowering the wheels and trailer, and peripheral wall means on said base forming continuations of the periphery of the trailer to form a closure therefor.

4. The structure as defined in claim 3 together with a roof structure for said trailer, said roof structure comprising a top panel having a forward portion resting on the front enclosure, depending side and rear walls hingedly connected to the top panel, and adjustable means anchoring the top panel from the hollow side enclosures of the trailer.

5. The structure as defined in claim 4 wherein said peripheral wall means includes pivotal front and rear walls on the base forming the ramps for the wheels.

* * * * *